United States Patent
Rosenzweig

(10) Patent No.: US 9,901,215 B2
(45) Date of Patent: Feb. 27, 2018

(54) MULTI-FUNCTIONAL FOOD PROCESSING SYSTEM

(71) Applicant: SharkNinja Operating LLC, Newton, MA (US)

(72) Inventor: Mark Rosenzweig, Chestnut Hill, MA (US)

(73) Assignee: SHARKNINJA OPERATING LLC, Newton, MA (US)

( * ) Notice: Subject to any disclaimer, the term of this patent is extended or adjusted under 35 U.S.C. 154(b) by 452 days.

(21) Appl. No.: 14/364,767

(22) PCT Filed: Dec. 12, 2012

(86) PCT No.: PCT/US2012/069233
§ 371 (c)(1),
(2) Date: Jun. 12, 2014

(87) PCT Pub. No.: WO2013/090424
PCT Pub. Date: Jun. 20, 2013

(65) Prior Publication Data
US 2014/0299687 A1 Oct. 9, 2014

Related U.S. Application Data

(60) Provisional application No. 61/569,525, filed on Dec. 12, 2011.

(51) Int. Cl.
*A47J 43/00* (2006.01)
*A47J 43/08* (2006.01)
(Continued)

(52) U.S. Cl.
CPC .......... *A47J 43/085* (2013.01); *A47J 43/046* (2013.01); *A47J 43/0722* (2013.01); *A47J 43/087* (2013.01); *F16D 1/10* (2013.01)

(58) Field of Classification Search
CPC ...... A47J 43/085; A47J 43/046; A47J 43/087; A47J 43/0722
(Continued)

(56) References Cited

U.S. PATENT DOCUMENTS 3,109,149 A 10/1963 Banasiewicz
3,109,949 A 11/1963 Hartwig et al.
(Continued)

FOREIGN PATENT DOCUMENTS

CN 2329289 Y 7/1999
CN 200980603 Y 11/2007
(Continued)

OTHER PUBLICATIONS

International Search Report and Written Opinion for PCT/US2012/069233 dated Apr. 2, 2015.
(Continued)

*Primary Examiner* — Faye Francis
(74) *Attorney, Agent, or Firm* — Cantor Colburn LLP

(57) ABSTRACT

A multi-functional food processing system includes a base having a first drive coupler and a second drive coupler, a first container to engage the first drive coupler, a second container to engage the second drive coupler, and a third container to engage the first drive coupler or the second drive coupler. The first container includes a first processing assembly where the first drive coupler is operable to rotate the first processing assembly at a first speed while the second container includes a second processing assembly where the second drive coupler is operable to rotate the second processing assembly at a second speed. The third container includes a third processing assembly and a transmission system, where the first drive coupler or the second drive coupler is operable to drive the transmission system to rotate the third processing assembly at a third speed.

20 Claims, 9 Drawing Sheets

(51) Int. Cl.
*A47J 43/046* (2006.01)
*A47J 43/07* (2006.01)
*F16D 1/10* (2006.01)

(58) Field of Classification Search
USPC .......... 241/282.1, 282.2; 366/197, 199, 205; 99/340
See application file for complete search history.

(56) References Cited

U.S. PATENT DOCUMENTS

| | | | |
|---|---|---|---|
| 3,385,117 A | | 5/1968 | Braun |
| D320,717 S | * | 10/1991 | O'Brien ........................ D7/384 |
| 5,338,111 A | | 8/1994 | Trocherie et al. |
| 5,645,346 A | | 7/1997 | Thuna |
| 5,979,806 A | * | 11/1999 | Borger ................... A47J 44/00 |
| | | | 241/101.01 |
| 6,012,837 A | | 1/2000 | Thuna |
| 6,065,861 A | * | 5/2000 | Chen ..................... A47J 27/004 |
| | | | 241/69 |
| 6,164,812 A | | 12/2000 | Brezovnik et al. |
| 6,189,441 B1 | * | 2/2001 | Beaudet ................ A47J 43/046 |
| | | | 241/101.01 |
| 6,481,342 B2 | * | 11/2002 | Thackray ............... A47J 43/06 |
| | | | 241/101.01 |
| D487,668 S | * | 3/2004 | Sands ........................... D7/378 |
| 6,758,592 B2 | * | 7/2004 | Wulf ..................... A47J 43/042 |
| | | | 215/228 |
| 7,066,640 B2 | * | 6/2006 | Sands ................... A47J 19/027 |
| | | | 366/205 |
| D545,126 S | | 6/2007 | White |
| 7,318,375 B2 | | 1/2008 | Huang |
| 8,985,843 B2 | * | 3/2015 | Sands ................... A47J 43/046 |
| | | | 366/197 |
| 2001/0006486 A1 | | 7/2001 | Ofverberg |
| 2002/0176320 A1 | | 11/2002 | Wulf et al. |
| 2005/0068846 A1 | * | 3/2005 | Wulf ..................... A47J 43/046 |
| | | | 366/199 |
| 2005/0185507 A1 | * | 8/2005 | Beesley ................... A47J 43/06 |
| | | | 366/205 |
| 2006/0007779 A1 | * | 1/2006 | Fernandez .......... A47J 43/0727 |
| | | | 366/206 |
| 2006/0153003 A1 | * | 7/2006 | Sands ................... A47J 43/046 |
| | | | 366/205 |
| 2010/0107893 A1 | * | 5/2010 | Goodrick-Meech .. A47J 43/046 |
| | | | 99/348 |
| 2015/0044344 A1 | * | 2/2015 | Choi ..................... A47J 43/046 |
| | | | 426/519 |
| 2015/0216359 A1 | * | 8/2015 | Schuette ........... B01F 15/00006 |
| | | | 241/282.1 |

FOREIGN PATENT DOCUMENTS

| | | |
|---|---|---|
| CN | 201123745 Y | 10/2008 |
| DE | 102010004728 A1 | 7/2011 |
| GB | 2 454 172 | 5/2009 |
| JP | 2004337524 A | 12/2004 |

OTHER PUBLICATIONS

International Preliminary Report on Patentability for PCT/US2012/069233 dated Apr. 23, 2015.
Extended Search Report; European Application No. 12856671.8; dated Jul. 4, 2016; 5 Pages.
Notification of the First Office Action and Search Report; Chinese Application No. 201280066804.0; dated Jul. 5, 2016; 19 Pages.
Patent Examination Report No. 1; Australian Application No. 2012352319; dated Aug. 12, 2016; 3 Pages.
Notification of the Second Office Action and Search Report; Chinese Application No. 201280066804.0; dated Mar. 15, 2017; 21 Pages.
Notification of the Third Chinese Office Action with translation; Chinese Application No. 201280066804.0; dated Aug. 5, 2017; pp. 1-16.

* cited by examiner

MULTI-FUNCTIONAL FOOD PROCESSING SYSTEM

RELATED APPLICATIONS

The present is a national stage filing under 35 U.S.C. § 371 of international PCT application, PCT/US2012/069233, filed Dec. 12, 2012, which claims priority and the benefit of U.S. Provisional Patent Application No. 61/569,525, filed Dec. 12, 2011, each of which is incorporated herein by reference.

SUMMARY

Multi-functional food processing system allows for multiple processing speeds to be provided on a single food processing platform.

In one embodiment, a multi-functional food processing system includes a base having a first drive coupler and a first jar or container configured to engage the first drive coupler. The first jar or container includes a first blade assembly where the first drive coupler is operable to rotate the first blade assembly at a first speed when the first jar or container is engaged to the base.

The system further includes a second jar or container configured to engage the first drive coupler. The second jar or container includes a second blade assembly and a driven coupler, whereby the first drive coupler is operable to drive the driven coupler such that the driven coupler is operable to rotate the second blade assembly at a second speed when the second jar or container is engaged to the base.

In one embodiment, the second speed is different from the first speed. In some embodiments, the second speed is in the range of about two-fold to about ten-fold slower than the first speed. In other embodiments, the second blade assembly is substantially similar to the first blade assembly.

In one embodiment, a multi-functional food processing system includes a base having a first drive coupler and a second drive coupler, a first container configured to engage the first drive coupler, a second container configured to engage the second drive coupler, and a third container configured to engage the first drive coupler or the second drive coupler.

In operation, the first container includes a first processing assembly where the first drive coupler is operable to rotate the first processing assembly at a first speed while the second container includes a second processing assembly where the second drive coupler is operable to rotate the second processing assembly at a second speed.

In one embodiment, the third container includes a third processing assembly and a gear, where the first drive coupler or the second drive coupler is operable to drive the gear, which in turn is operable to rotate the third processing assembly at a third speed.

In some embodiments, the second speed is different from the first speed. In other embodiments, the second speed is in the range of about three-fold to about eight-fold slower than the first speed.

In one embodiment, the third speed is different from one of the first speed and the second speed. In some embodiments, the third speed is in the range of about two-fold to about five-fold slower than the second speed. In other embodiments, the third speed is in the range of about five-fold to about fifty-fold slower than the first speed.

In some embodiments, the third container is substantially similar to one of the first container and the second container. In other embodiments, the third assembly is substantially similar to one of the first assembly and the second assembly.

Other variations, embodiments and features of the present disclosure may become more evident from the following detailed description and drawings.

DETAILED DESCRIPTION

It will be appreciated by those of ordinary skill in the art that the disclosure can be embodied in other specific forms without departing from the spirit or essential character thereof. The presently disclosed embodiments are therefore considered in all respects to be illustrative and not restrictive.

Figure 1:
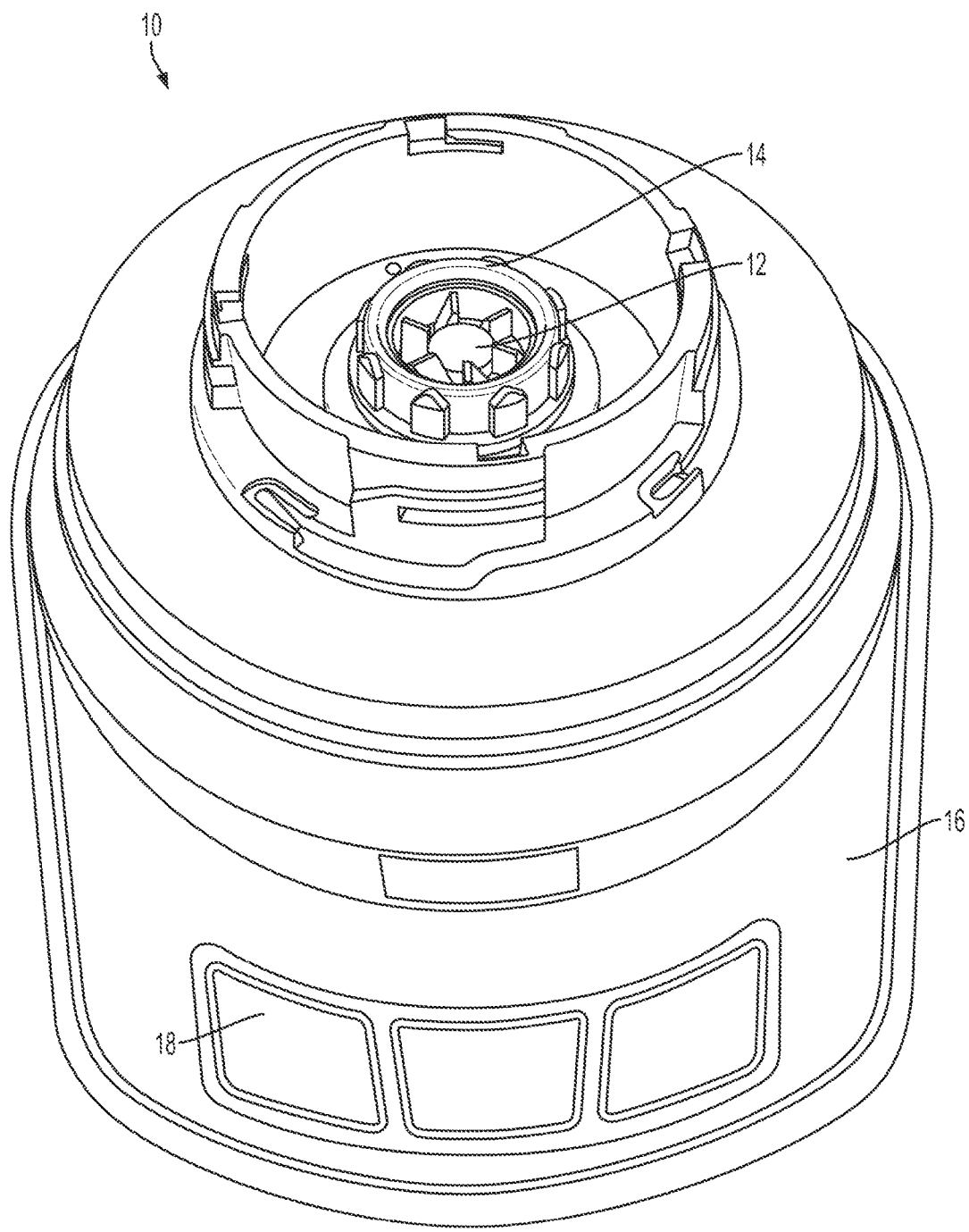
FIG. 1 is a perspective view of a base for a multi-functional food processing system according to one embodiment of the present disclosure.

FIG. 1 is a perspective view of a base 10 for a multi-functional food processing system according to one embodiment of the present disclosure. The base 10 includes a body 16 having a first drive coupler 12 and a second drive coupler 14. The drive couplers 12, 14 can be driven by a motor (not shown) within the body 16 of the base 10. The base 10 includes a control panel 18 with options for turning on/off the motor and modes of operating such as pulsing blending or continuous food processing. The control panel 18 may also include other features as can be appreciated by one skilled in the art. In some embodiments, the drive couplers 12, 14 may be used for engaging blender attachments for the processing of food products within blender jars or containers. This will become more apparent in subsequent figures and discussion.

Figure 2:
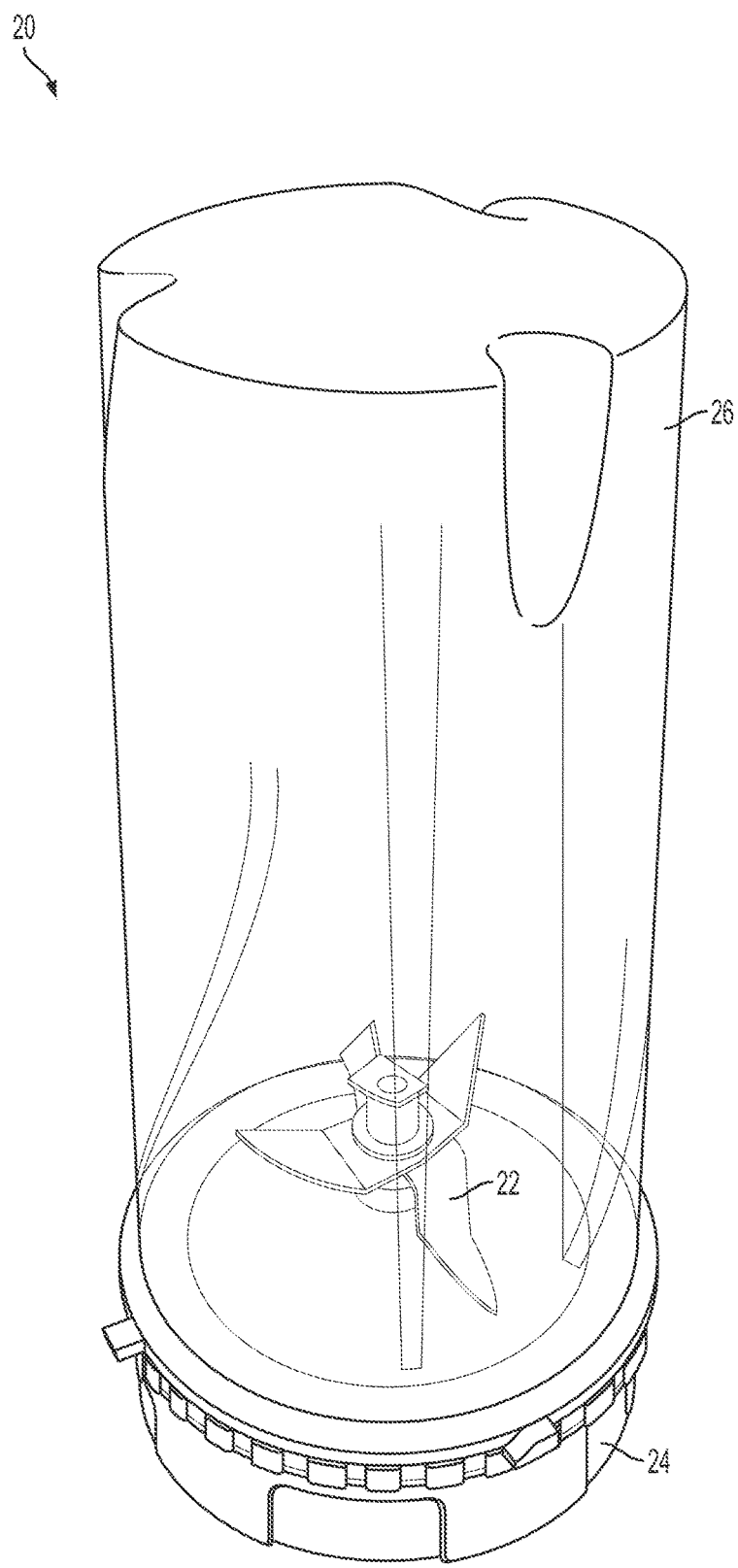
FIGS. 2-3 are top and bottom perspective views of a container for a multi-functional food processing system according to one embodiment of the present disclosure.
Figure 3:
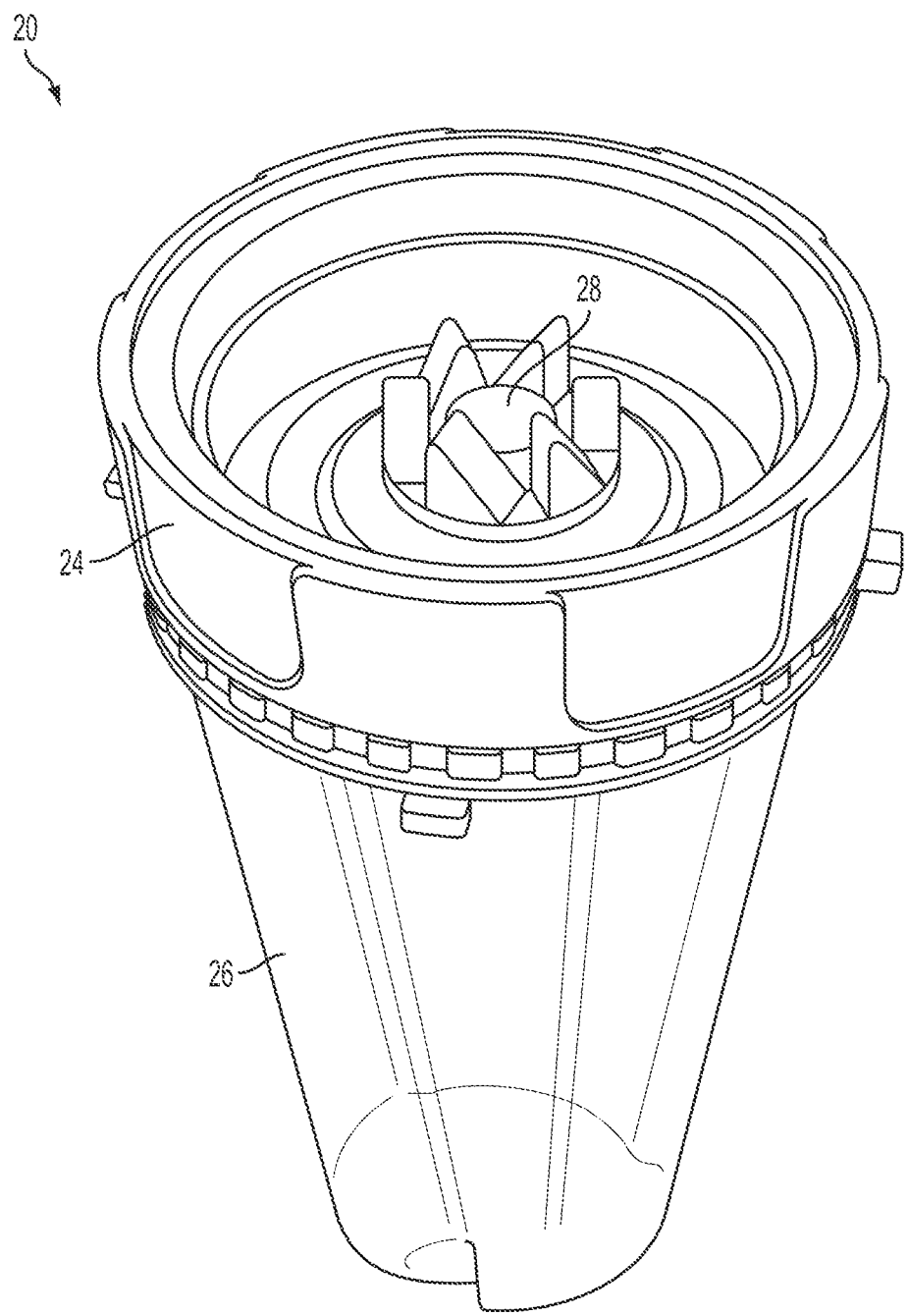

FIGS. 2-3 are top and bottom perspective views of a 16 oz. (0.47 L) jar or container 20 for a multi-functional food processing system according to one embodiment of the present disclosure. The container 20 includes a body 26 having an open end for receiving food products, the open end capable of being secured by a lid 24. In some embodiments, the container 20 may be used for processing (e.g., blending, mixing, chopping) food products including the likes of ice, water, fruits, alcohol, milk, juice and soda, among other types of liquid additives. In other embodiments, food products may include bread, rice, pasta, vegetables, fruits, dairy products, meats, fish, poultry, fats and oils, and vitamins and supplements, among others. In one embodiment, the lid 24 may be integrated with a blade assembly 22 for the processing of food products within the container 20. In some instances, the lid 24 may be integrated with other processing assemblies 22 (e.g., cookie dough paddle, whisk attachment). In other instances, the processing assembly 22 may be coupled to but not integrated with the lid 24.

In one embodiment, the lid 24 includes a driven coupler 28 that can complementarily engage the first drive coupler 12 of the base 10. In operation, when the container 20 is mounted on the base 10, the first drive coupler 12 is capable of driving the complementary driven coupler 28 of the container 20 such that the driven coupler 28 in turn drives the blade assembly 22 for the processing of food products within the container 20. In one example, engagement of the couplers 12, 28 allows the blade assembly 22 to rotate at a first speed (e.g., 18,000 revolutions per minute).

Figure 4:
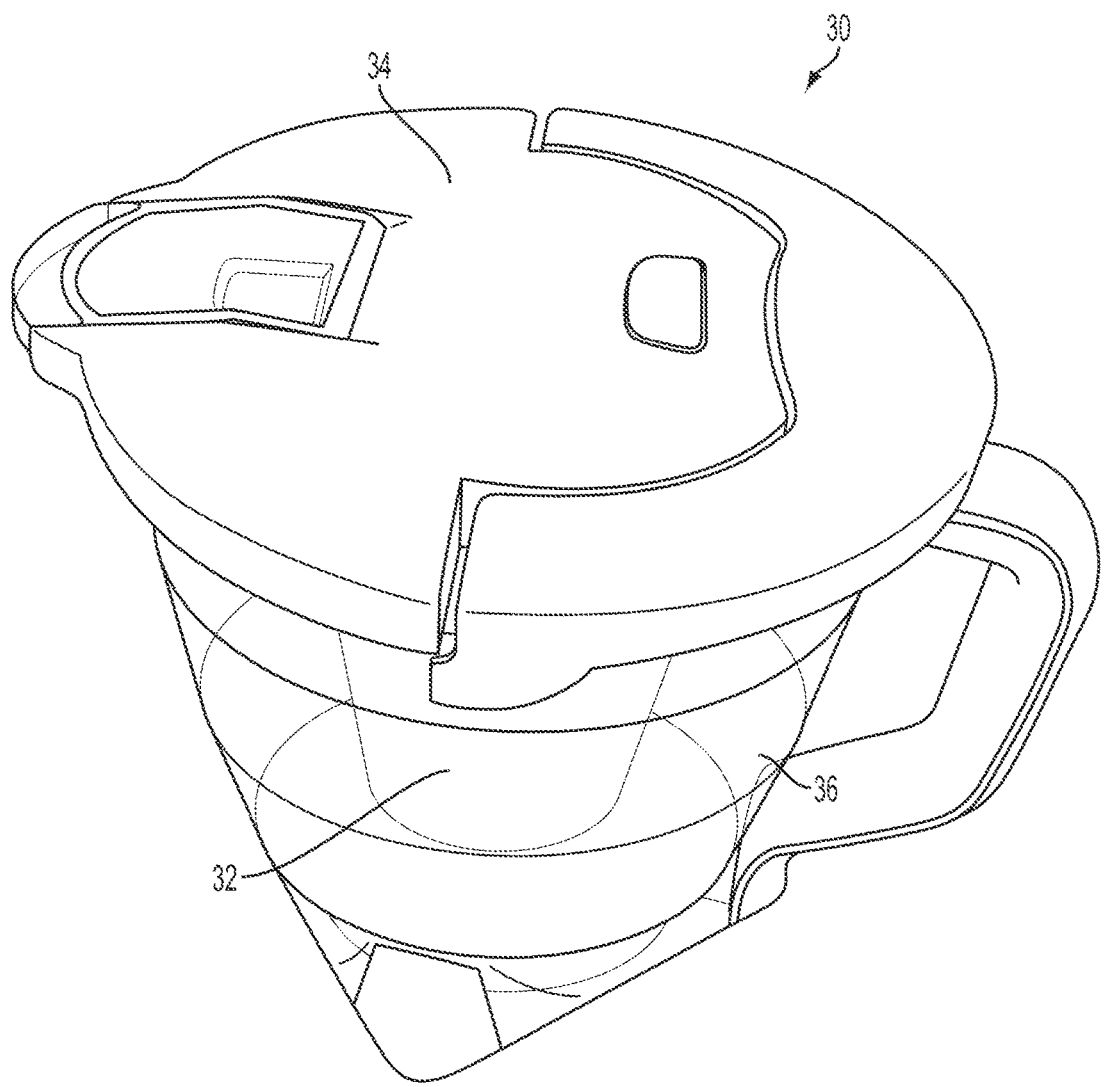
FIGS. 4-5 are top and bottom perspective views of another container for a multi-functional food processing system according to one embodiment of the present disclosure.
Figure 5:
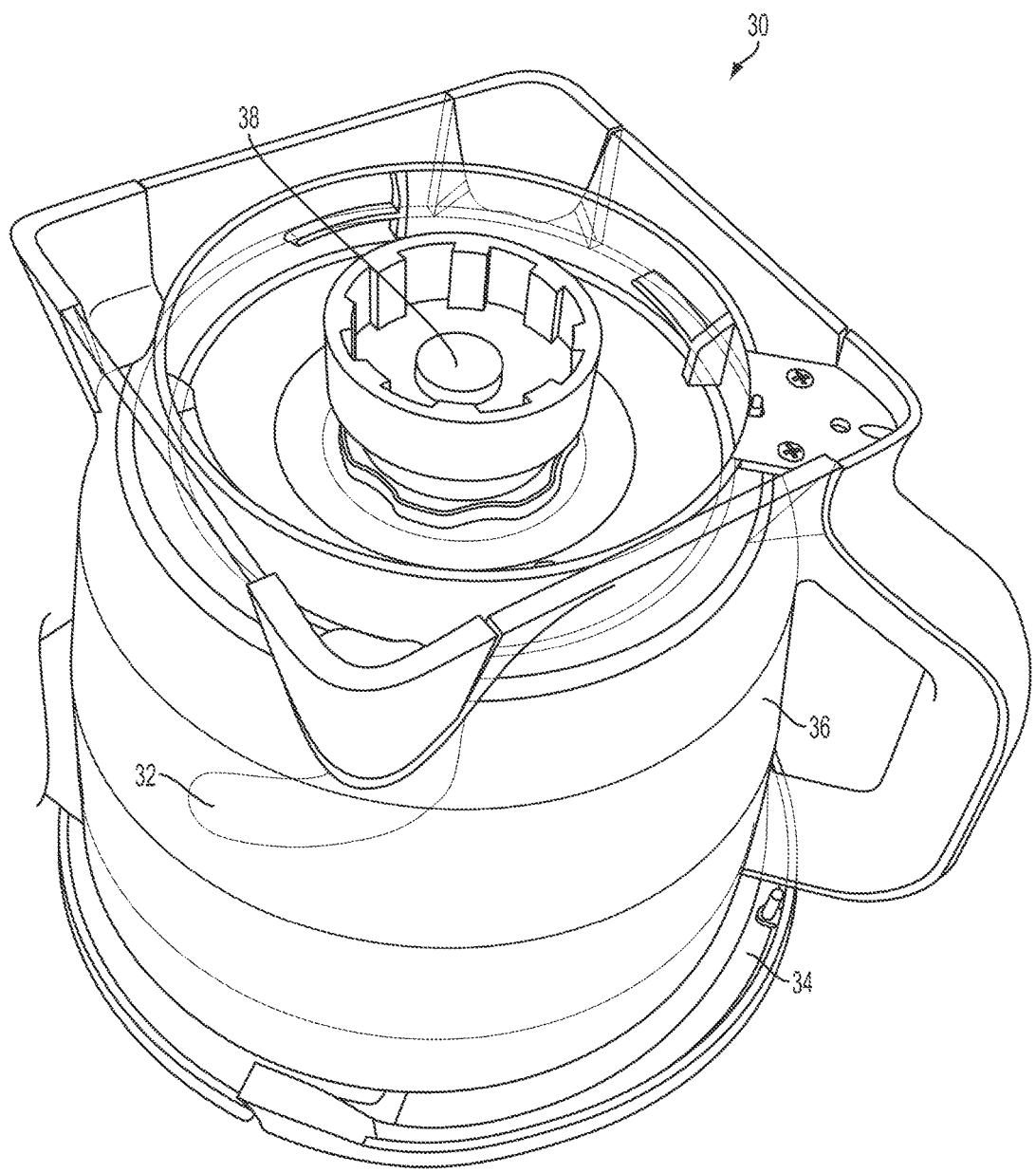

FIGS. 4-5 are top and bottom perspective views of a container 30 for a multi-functional food processing system according to one embodiment of the present disclosure. The container 30 includes a container body 36 having an open end for receiving food products, the open end capable of being secured by a lid 34. In some embodiments, the lid 34 may include security features including the likes of an actuable lever, a corresponding bail handle, and a release button, to name a few. The lid 34 may also include a pour spout having a cover. In other embodiments, the lid 34 may also include other features. As shown in the figures, the container 30 may include a handle to facilitate movement of the container 30. In one example, the volume of the container 30 is about 46 oz. (1.36 L). In another example, the volume of the container 30 is about 72 oz. (2.13 L). It will be appreciated by one skilled in the art that the container 30 can come in a variety of shapes and sizes.

In one embodiment, the container 30 may include a blade assembly 32 for processing food products contained within. In some embodiments, the blade assembly 32 or other processing assemblies 32 (e.g., cookie dough paddle, whisk attachment) may be integrated with the lid 34. In other embodiments, the processing assembly 32 may be situated within the container 30 without being integrated to the lid 34.

In one embodiment, the bottom of the container 30 includes a corresponding driven coupler 38 that can complimentarily engage the second drive coupler 14 of the base 10. In operation, when the container 30 is mounted on the base 10, the second drive coupler 14 is capable of driving the driven coupler 38 of the container 30 such that the driven coupler 38 in turn drives the blade assembly 32 for the processing of food products within the container 30. In one example, engagement of the couplers 14, 38 allows the blade assembly 32 to rotate at a second speed (e.g., 3,600 revolutions per minute).

In one embodiment, the second speed may be different from the first speed. For example, the second speed may be in the range of about three-fold to about eight-fold slower than the first speed. In other examples, the second speed may be able to provide a reduction in speed from the first speed by at least three-fold, or four-fold, or five-fold, or six-fold, or seven-fold. And although the containers 20, 30 as shown are substantially different in terms of size and volume, in some embodiments, the containers 20, 30 may be substantially similar in size or volume or both.

Figure 6:
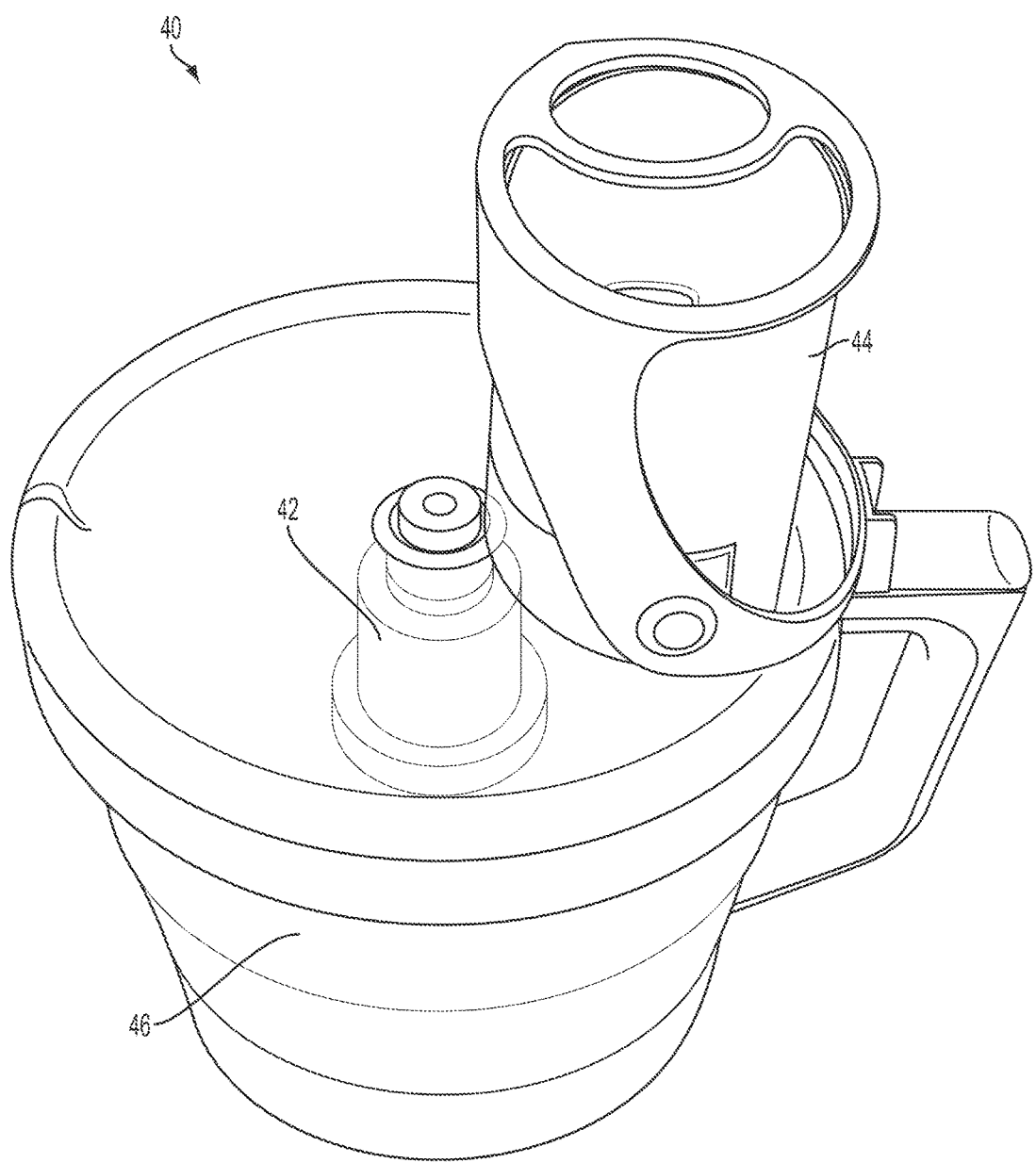
FIGS. 6-7 are top and bottom perspective views of yet another container for a multi-functional food processing system according to one embodiment of the present disclosure.
Figure 7:
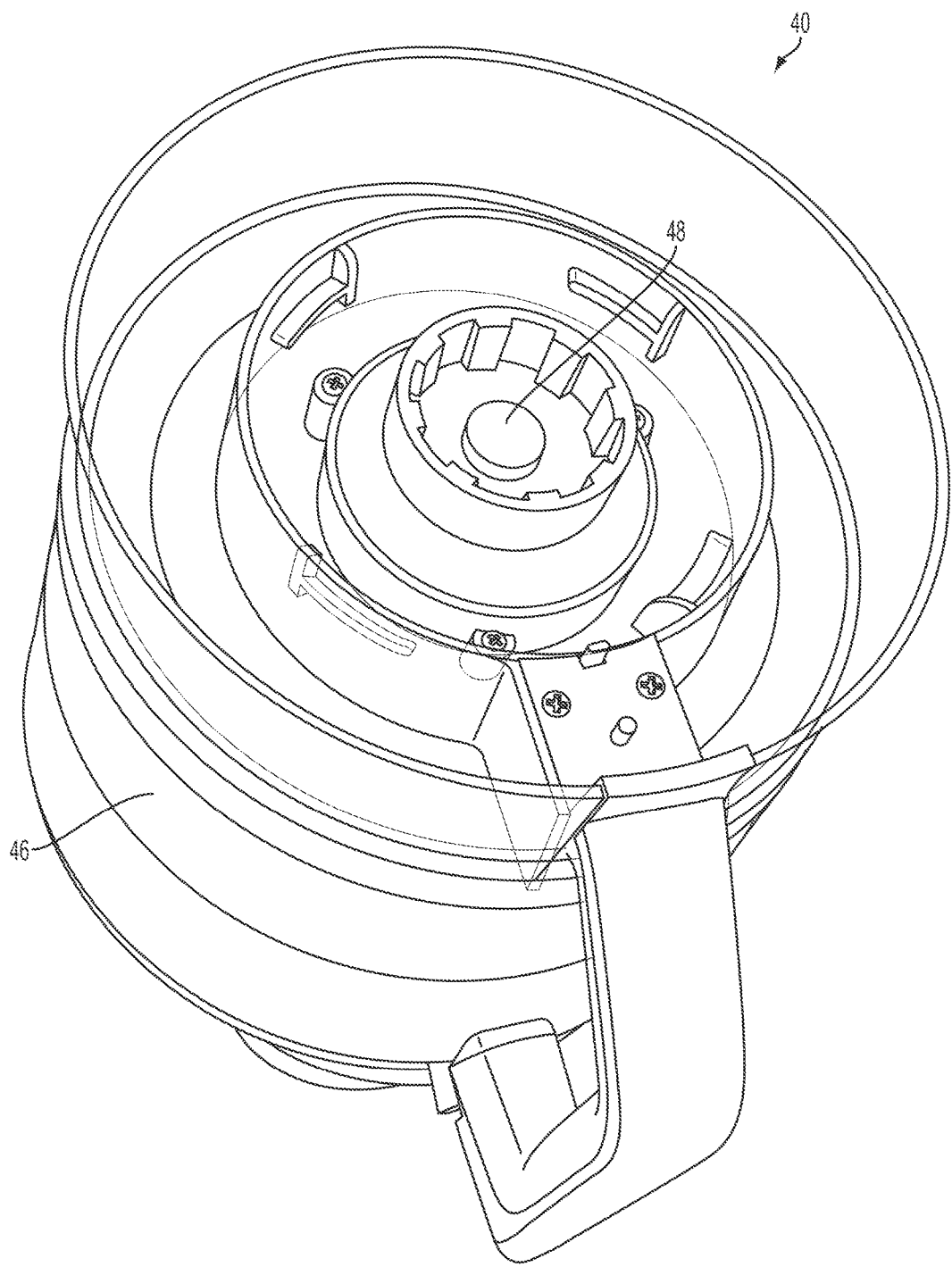

FIGS. 6-7 are top and bottom perspective views of a container 40 for a multi-functional food processing system according to one embodiment of the present disclosure. The container 40 includes a body 46 having an open end for receiving food products, the open end capable of being secured by a lid 44. In this instance, the lid 44 includes a feed chute similar to that of a food processor. In some embodiments, the lid 44 may include other security features to ensure safe operation of the feed chute. Similar to the previous container 30, this container 40 may also include a handle to facilitate movement of the container 40. In some embodiments, the container 40 may be substantially similar as that of the other containers 20, 30. In other embodiments, the container 40 may be substantially different from the other containers 20, 30.

Similar to above, the container 40 may include a blade assembly 42 for processing food products contained within. In some embodiments, the blade assembly 42 or other processing assemblies 42 (e.g., cookie dough paddle, whisk attachment) may be integrated with the lid 44. In other embodiments, the processing assembly 42 may be situated within the container 40 without being integrated to the lid 44. In some embodiments, the blade assembly 42 may be substantially similar as that of the other blade assemblies 22, 32. In other embodiments, the blade assembly 42 may be substantially different from the other blade assemblies 22, 32.

In one embodiment, the bottom of the container 40 includes a corresponding driven coupler 48 that can complimentarily engage the second drive coupler 14 of the base 10. In operation, when the container 40 is mounted on the base 10, the second drive coupler 14 is capable of driving the driven coupler 48 of the container 40 such that the driven coupler 48 in turn drives the blade assembly 42 for the processing of food products within the container 40. In this instance, the engagement of the couplers 14, 48 is able to allow the blade assembly 42 to rotate at a third speed (e.g., 1,200 revolutions per minute). Although the driven coupler 48 at the bottom of the container 40 is shown to engage the second drive coupler 14 of the base 10, it will be appreciated by one skilled in the art that the driven coupler 48 can also be designed to engage the first drive coupler 12 of the base 10.

Figure 8:
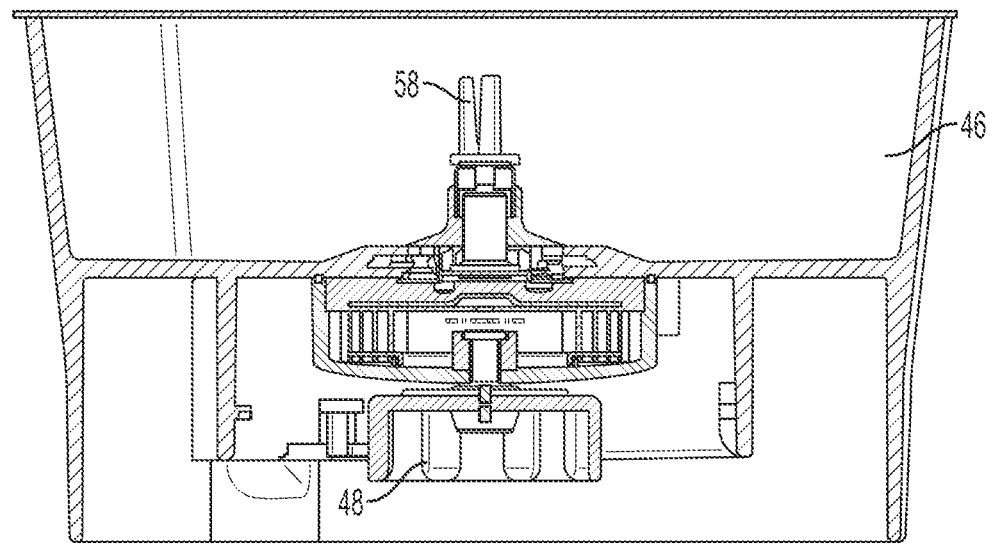
FIGS. 8-9 are cross-sectional views of a transmission system for a multi-functional food processing system according to one embodiment of the present disclosure.
Figure 9:
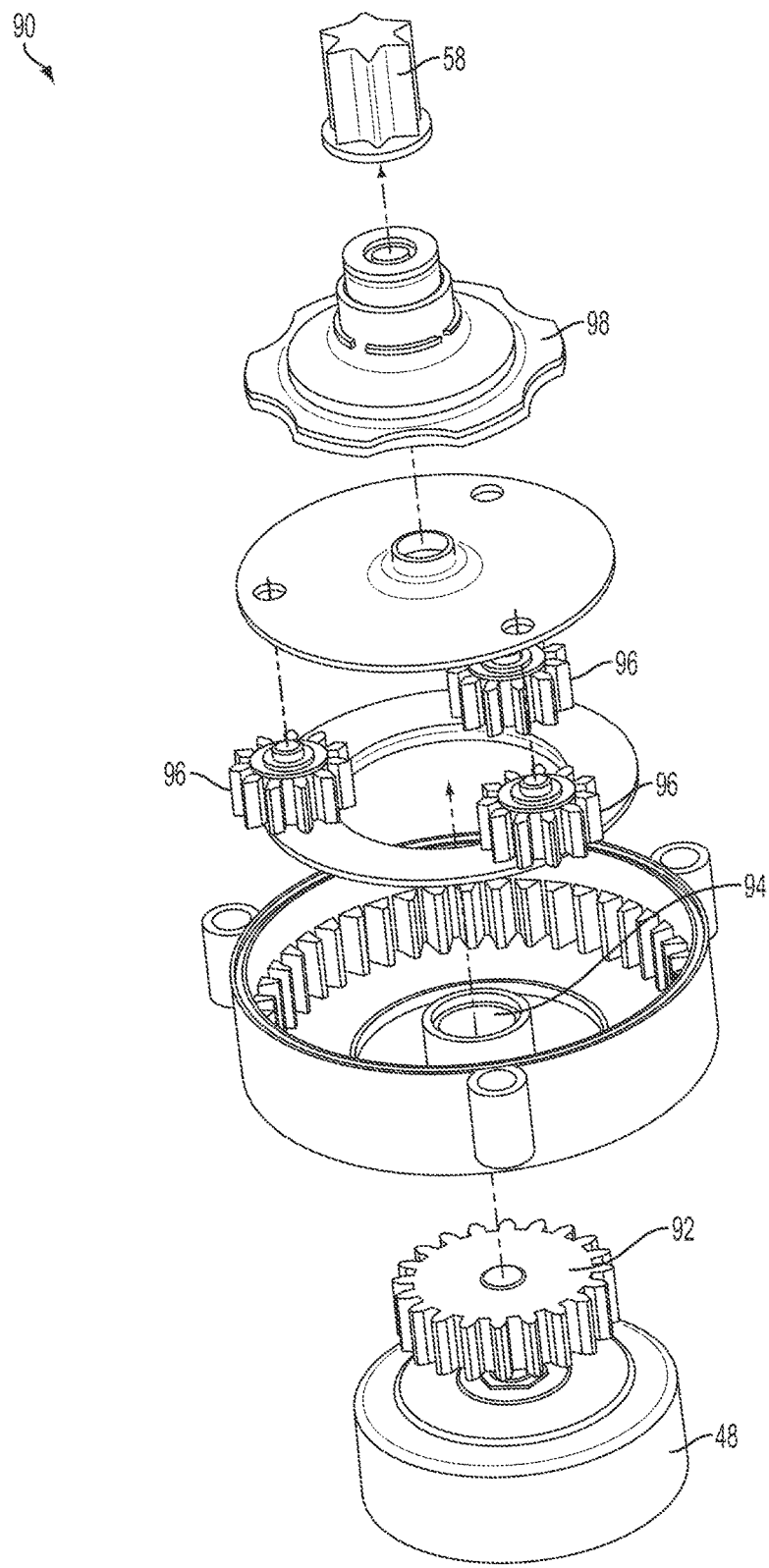

FIGS. 8-9 are cross-sectional views of a transmission system 90 for a multi-functional food processing system according to one embodiment of the present disclosure. FIG. 8 is a cross-sectional view of the body 46 of the container 40 showing the driven coupler 48 at bottom for engaging the base 10 and a corresponding coupling 58 within the body 46 for engaging a processing assembly such as a blade assembly 42. In one embodiment, the transmission system 90, best illustrated in FIG. 9, includes a gear reduction that allows the processing speed to be altered from its original speed of revolution.

As shown in FIG. 9, the transmission system 90, integrated into the base of the container 40, includes the driven coupler 48 at the bottom of the container 40 for engaging the first drive coupler 12 or the second drive coupler 14 of the base 10. In one embodiment, the couplers 48 and 12, or 48 and 14, when coupled, are able to drive a primary or central gear 92. In some instances, the central gear 92 may also be referred to as the sun gear. Adjacent the sun gear 92 is a gear housing 94 for receiving a set of secondary or auxiliary gears 96. In some instances, the auxiliary gears 96 may also be referred to as the planetary gears. In one embodiment, the gear housing 94 may be affixed to the container 40 and provide stability and traction to the planetary gears 96.

In operation, rotation of the sun gear 92 at one speed is able to cause the planetary gears 96 to rotate at another speed, the two speeds being different, due to the difference in size and coupling ratio between the two gears 92, 96. The difference in size and coupling ratio is capable of generating the difference in the speeds. For example, the reduction in speed may be by about two-fold, or by about three-fold, or by about four-fold, or by about five-fold, or by about six-fold, or by about seven-fold, or by about eight-fold, or by about nine-fold, or by about ten-fold. In some embodiments, the reduction or difference in speed can be greater than ten-fold. Because the transmission system 90 is integrated into the base of the container 40, various parts including the likes of metal plates, seals, bushings, o-rings, among others, may be over-molded or attached to the transmission system 90. For example, the bottom of the container 40 may include a seal 98 for holding an oil bushing and a lip seal for securing all the liquid contents within the container 40. In another example, the bottom of the container 40 may include a metal plate attached to the shafts of the planetary gears 96 for engaging and/or spinning with the gears 96. The transmission system 90 may also include coupling shafts and other gear couplers (not shown).

In one embodiment, the gear reduction 92, 96 may result in the assembly coupling 58 capable of spinning at a different speed than that of the driven coupler 48. This in turn may allow the blade assembly 42 to spin at a different speed than the other processing assemblies 22, 32. In other words, the container 40 may include a driven coupler 48 that is capable of engaging one of the first drive coupler 12 and the second drive coupler 14 of the base, the container 40 also having a processing assembly 42, a sun gear 92, and planetary gears 96, whereby the one of the first drive coupler 12 and the second drive coupler 14 is capable of driving the sun gear 92 and the planetary gears 96 to rotate the processing assembly 42 at a third speed, where the third speed is different from the first speed and the second speed.

In some embodiments, the third speed may be in the range of about two-fold to about five-fold slower than the second speed. In other embodiments, the third speed may be in the range of about five-fold to about fifty-fold slower than the first speed.

In one embodiment, a multi-functional food processing system need not include all three containers 20, 30, 40 but can operate with only two of the three containers 30, 40. Doing so allows the base 10 to be simplified to having only one drive coupler, e.g., the second drive coupler 14. The simplification from two drive couplers 12, 14 to one drive coupler 14 may translate to reduced manufacturing cost.

In one embodiment, a multi-functional food processing system includes a base 10 having a first drive coupler 14. The system also includes a first container 30 configured to engage the first drive coupler 14, the first container 30 having a first processing assembly 32 where the first drive coupler 14 is operable to rotate the first processing assembly 32 at a first speed. The system also includes a second container 40 configured to engage the first drive coupler 14, the second container 40 having a second processing assembly 42 and gears 92, 96, where the first drive coupler 14 is operable to drive the gears 92, 96, and where the gears 92, 96 are operable to rotate the second processing assembly 42 at a second speed. In some instances, the two processing assemblies 32, 42 can be substantially similar or different in terms of shape or size or function.

In some embodiments, the second speed is different from the first speed. In other embodiments, the second speed is in the range of about two-fold to about ten-fold slower than the first speed.

Although the disclosure has been described in detail with reference to several embodiments, additional variations and modifications exist within the scope and spirit of the disclosure as described and defined in the following claims.

What is claimed is:

1. A system comprising:
   (a) a base having a first drive coupler and a second drive coupler;
   (b) a first container configured to engage the first drive coupler, the first container having a first processing assembly wherein the first drive coupler is operable to rotate the first processing assembly at a first speed;
   (c) a second container configured to engage the second drive coupler, the second container having a second processing assembly wherein the second drive coupler is operable to rotate the second processing assembly at a second speed; and
   (d) a third container configured to engage one of the first drive coupler and the second drive coupler, the third container having a third processing assembly coupled to a transmission system, the transmission system being integrated into a base of the third container, wherein the one of the first drive coupler and the second drive coupler is operable to drive the transmission system to rotate the third processing assembly at a third speed, wherein the third speed is different from the first speed and the second speed.

2. The system of claim 1, wherein the transmission system includes a driven coupler, and the one of the first drive coupler and the second drive coupler is operable to drive the transmission system by engaging with the driven coupler.

3. The system of claim 1, wherein the second speed is different from the first speed.

4. The system of claim 3, wherein the second speed is in the range of three-fold to about eight-fold slower than the first speed.

5. The system of claim 1, wherein the third speed is different from one of the first speed and the second speed.

6. The system of claim 5, wherein the third speed is in the range of two-fold to five-fold slower than the second speed.

7. The system of claim 5, wherein the third speed is in the range of five-fold to fifty-fold slower than the first speed.

8. The system of claim 1, wherein at least one of the first, second, and third processing assemblies comprises a blade assembly.

9. The system of claim 1, wherein at least one of the first, second, and third containers has an open end for receiving food products, the open end capable of being secured by a lid, and wherein at least one of the first, second, and third processing assemblies is integrated with the lid.

10. The system of claim 1, wherein the transmission system includes a sun gear and at least one planetary gear, the sun gear being larger in size than the at least one planetary gear.

11. A method comprising:
   (a) providing a base having a first drive coupler and a second drive coupler, a first container, a second container and a third container;
   (b) engaging the first container with the first drive coupler, the first container having a first processing assembly;
   (c) operating the first drive coupler to rotate the first processing assembly at a first speed;
   (d) engaging the second container with the second drive coupler, the second container having a second processing assembly;
   (e) operating the second drive coupler to rotate the second processing assembly at a second speed; and
   (f) engaging the third container with one of the first drive coupler and the second drive coupler, the third container having a third processing assembly coupled to a transmission system, the transmission system being integrated into a base of the third container; and (g) operating one of the first drive coupler and the second drive coupler to drive the transmission system to rotate the third assembly at a third speed, the third speed being different from the first speed and the second speed.

12. The method of claim 11, wherein the transmission system includes a driven coupler, and the one of the first drive coupler and the second drive coupler is operable to drive the transmission system by engaging with the driven coupler.

13. The method of claim 11, wherein the second speed is different from the first speed.

14. The method of claim 13, wherein the second speed is in the range of three-fold to eight-fold slower than the first speed.

15. The method of claim 11, wherein the third speed is different from one of the first speed and the second speed.

16. The method of claim 15, wherein the third speed is in the range of two-fold to five-fold slower than the second speed.

17. The method of claim 15, wherein the third speed is in the range of five-fold to fifty-fold slower than the first speed.

18. The method of claim 11, wherein at least one of the first, second, and third processing assemblies comprises a blade assembly.

19. The method of claim 11, wherein at least one of the first, second, and third containers has an open end for receiving food products, the open end capable of being secured by a lid, and wherein at least one of the first, second, and third processing assemblies is integrated with the lid.

20. The system of claim 11, wherein the transmission system includes a sun gear and at least one planetary gear, the sun gear being larger in size than the at least one planetary gear.

* * * * *